(12) United States Patent
Pak (10) Patent No.: US 11,798,033 B2
(45) Date of Patent: Oct. 24, 2023

(54) METHOD OF PROVIDING CONTENT AND ADVERTISEMENT CUSTOMIZED TO A PASSENGER, AND A SERVER PERFORMING THE SAME

(71) Applicants: HYUNDAI MOTOR COMPANY, Seoul (KR); KIA CORPORATION, Seoul (KR)

(72) Inventor: Nahyeon Pak, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/590,492

(22) Filed: Feb. 1, 2022

(65) Prior Publication Data

US 2023/0056582 A1    Feb. 23, 2023

(30) Foreign Application Priority Data

Aug. 18, 2021  (KR) .......................... 10-2021-0108709

(51) Int. Cl.
   *G06Q 30/00*    (2023.01)
   *G06Q 30/0251*  (2023.01)
   *B60W 40/08*    (2012.01)

(52) U.S. Cl.
   CPC ......... *G06Q 30/0266* (2013.01); *B60W 40/08* (2013.01); *G06Q 30/0269* (2013.01); *B60W 2540/01* (2020.02); *B60W 2540/043* (2020.02)

(58) Field of Classification Search
   None
   See application file for complete search history.

(56) References Cited

U.S. PATENT DOCUMENTS

2002/0065046 A1* 5/2002 Mankins ................. G08G 1/01
                                                    455/456.1
2014/0136330 A1* 5/2014 Smereka ............ G06Q 30/0265
                                                    705/14.62
(Continued)

FOREIGN PATENT DOCUMENTS

JP         2005010661      *  1/2005
KR       101505819 B1        3/2015
(Continued)

*Primary Examiner* — Michael W Schmucker
(74) *Attorney, Agent, or Firm* — LEMPIA SUMMERFIELD KATZ LLC (57) ABSTRACT

A method of providing a content and advertisement customized to a passenger boarding a vehicle includes: receiving passenger information about a passenger from a user terminal of a passenger in a vehicle by a server; determining a passenger's preference based on the passenger information, and selecting a plurality of pieces of content information and a plurality of pieces of advertisement information according to the determined passenger's preference by the server; calculating an estimated travel time for the vehicle to arrive at a destination based on the passenger information by the server; creating a playlist by selecting the content information and the advertisement information such that the total sum of the replay time is at least equal to the estimated travel time among a plurality of pieces of selected content information and a plurality of pieces of selected advertisement information; and transmitting the created playlist to the passenger terminal.

6 Claims, 5 Drawing Sheets

(56) References Cited

U.S. PATENT DOCUMENTS

| | | | | |
|---|---|---|---|---|
| 2014/0188920 A1* | 7/2014 | Sharma | ................. | G06F 16/635 |
| | | | | 707/758 |
| 2014/0298169 A1* | 10/2014 | Williams | ............... | G06Q 50/10 |
| | | | | 715/716 |
| 2021/0096809 A1* | 4/2021 | Woo | ....................... | G05B 15/02 |
| 2021/0297472 A1* | 9/2021 | Calvert | ................. | G08G 1/123 |

FOREIGN PATENT DOCUMENTS

| | | |
|---|---|---|
| KR | 20200124433 A | 11/2020 |
| KR | 102239439 B1 | 4/2021 |
| WO | WO-2018104945 A1 * | 6/2018 |

* cited by examiner

METHOD OF PROVIDING CONTENT AND ADVERTISEMENT CUSTOMIZED TO A PASSENGER, AND A SERVER PERFORMING THE SAME

CROSS-REFERENCE TO RELATED APPLICATION

This application claims priority to and the benefit of Korean Patent Application No. 10-2021-0108709, filed in the Korean Intellectual Property Office on Aug. 18, 2021, the entire contents of which are incorporated herein by reference.

FIELD

The present disclosure relates to a method of providing an advertisement and a server performing the same.

BACKGROUND

Recently, in order to provide information related to an operation of a taxi vehicle, and/or various contents and advertisements to a passenger in a taxi vehicle, taxi vehicles in which a display device is mounted at the rear seat of the taxi vehicle are increasing.

However, in most cases, the contents and/or advertisements provided through the display device in the taxi vehicle are standardized for a plurality of passengers. Therefore, there is a problem that the publicity effect due to the provision of the contents and/or the advertisements is low because the passenger's preference is not reflected at all.

The above information disclosed in this Background section is only for enhancement of understanding of the background of the present disclosure, and therefore it may contain information that does not form the prior art that is already known to a person of ordinary skill in the art.

SUMMARY

The present disclosure provides advertisement and content reflecting the passenger's preference during travel time to the passenger through the terminal positioned in the taxi vehicle.

In addition, the present disclosure provides advertisements and contents reflecting passenger's common preferences when a plurality of passengers have boarded.

According to an embodiment of the present disclosure, a method for providing a content and advertisement customized to a passenger of a vehicle includes: receiving passenger information about a passenger from a user terminal of a passenger in a vehicle by a server; determining a passenger's preference based on the passenger information, and selecting a plurality of pieces of content information and a plurality of pieces of advertisement information according to the determined passenger's preference by the server; calculating an estimated travel time for the vehicle to arrive at a destination based on the passenger information by the server; creating at least one playlist by selecting the content information and the advertisement information such that the total sum of the replay time is at least equal to the estimated travel time among a plurality of pieces of selected content information and a plurality of pieces of selected advertisement information; and transmitting the created playlist to the passenger terminal positioned in the vehicle by the server.

The receiving of the passenger information by the server may include receiving personal information including at least one of a passenger's name, gender, age, occupation, and contact information, and usage information including at least one of information about a search word input by the passenger to a web server through the user terminal, cookie information of the web server, and a frequently visited web server.

The selecting of a plurality of pieces of content information and a plurality of pieces of advertisement information may include: determining a passenger's preference for a content type based on the usage information; and selecting a plurality of pieces of content information and a plurality of pieces of advertisement information according to the passenger's preference for the content type.

The creating of at least one playlist by the server may include creating a playlist such that one of a plurality of pieces of advertisement information is positioned between two pieces of content information of a plurality of pieces of selected content information by the server.

The creating of at least one playlist by the server may include creating a playlist so that the advertisement is played while the first content is playing when the replay time of the first content corresponding to the first content information, which is one of a plurality of pieces of content information in the playlist, is equal to or longer than a predetermined time.

A method for providing a content and advertisement customized to a passenger boarding a vehicle includes: receiving passenger information about a passenger from a user terminal of a passenger in a vehicle by a server; receiving fellow passenger information about a fellow passenger in the vehicle from the user terminal; determining a passenger's preference based on the passenger information, and determining a fellow passenger's preference based on the fellow passenger information, selecting a plurality of pieces of content information depending on the determined passenger's preference and the fellow passenger's preference to create a first content information group, and selecting a plurality of advertisement information to create a first advertisement information group by the server; calculating an estimated travel time for the vehicle to arrive at the destination based on the passenger information by the server; selecting a plurality of pieces of content information from the first content information group such that the sum of the replay time of a plurality of pieces of content information and a plurality of pieces of advertisement information is based on the estimated travel time, selecting a plurality of pieces of advertisement information from the first advertisement information group, and creating at least one common playlist by combining a plurality of pieces of selected content information and a plurality of pieces of selected advertisement information by the server; and transmitting the created common playlist to the passenger terminal positioned in the vehicle by the server.

A server for providing a content and advertisement customized to a passenger boarding a vehicle according to an embodiment includes: a communication unit and a controller that receive passenger information about a passenger from a user terminal of the passenger in the vehicle, wherein the controller determines a passenger's preference based on the passenger information and selects a plurality of pieces of content information and a plurality of pieces of advertisement information depending on the determined passenger's preference, calculates an estimated travel time for the vehicle to arrive at the destination based on the passenger information, creates at least one playlist by selecting the content information and advertisement information such that the sum of the replay time is equal to at least the estimated travel time among the selected plurality of pieces of content information and advertisement information; and transmits the playlist created to the passenger terminal located in the vehicle by the communication unit.

The passenger information may include personal information including at least one of a passenger's name, gender, age, occupation, and contact information, and usage information including at least one of a search word input by the passenger to the web server through the user terminal, cookie information on the web server, and information on frequently visited web servers.

The controller may determine a passenger's preference for a content type based on the usage information, and select a plurality of pieces of content information and a plurality of pieces of advertisement information according to the passenger's preference for the content type.

The playlist may be created such that one of a plurality of pieces of advertisement information is positioned between two pieces of content information of a plurality of pieces of selected content information.

The playlist may be created such that the advertisement is played while the first content is being played, when the replay time of the first content corresponding to the first piece of content information, which is one of a plurality of pieces of content information in the playlist, is longer than or equal to a predetermined time.

In another embodiment of the present disclosure, a server for providing a content and advertisement customized to a passenger of a vehicle includes: a communication unit and a controller that receive passenger information about a passenger from a user terminal of the passenger in the vehicle, wherein the controller receives fellow passenger information about a fellow passenger in the vehicle from the user terminal, determines a passenger's preference based on the passenger information, selects a plurality of pieces of content information to create a first content information group depending on the determined passenger's preference and fellow passenger's preference, selects a plurality of pieces of advertisement information to create a first advertisement information group, calculates an estimated travel time for the vehicle to arrive at the destination based on the passenger information, selects a plurality of pieces of content information from the first content information group and a plurality of pieces of advertisement information from the first advertisement information group so that the total sum of the replay time of a plurality of pieces of content information and a plurality of pieces of advertisement information is based on the estimated travel time, creates at least one common playlist by combining a plurality of pieces of selected content information and a plurality of pieces of selected advertisement information, and transmits the created common playlist to the passenger terminal positioned in the vehicle through the communication unit.

According to at least one of the embodiments according to the present disclosure, it is possible to provide the content and advertisement suitable to the personal preference of the passenger.

According to at least one of the embodiments according to the present disclosure, it is possible to provide the content and advertisement based on the common preference of all of a plurality of passengers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION OF THE EMBODIMENTS

Hereinafter, embodiments of the present specification are described below in detail with reference to the accompanying drawings. In the present disclosure, the same or similar components are denoted by the same or similar reference numerals, and an overlapped description thereof is omitted. The terms "module" and "unit" for components used in the following description are used only in order to easily make a specification. Therefore, these terms do not have meanings or roles that distinguish them from each other in themselves. Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

Further, in describing embodiments of the present disclosure, when it is determined that a detailed description of the well-known art associated with the present disclosure may obscure the gist of the present disclosure, it is omitted. In addition, the accompanying drawings are provided only in order to allow embodiments disclosed in the present disclosure to be easily understood and are not to be interpreted as limiting the scope and areas of applicability of the present disclosure, and it is to be understood that the present disclosure includes all modifications, equivalents, and substitutions without departing from the scope and spirit of the present disclosure.

Terms including ordinal numbers such as first, second, and the like are used only to describe various components, and are not to be interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. When a component, device, element, or the like of the present disclosure is described as having a purpose or performing an operation, function, or the like, the component, device, or element should be considered herein as being "configured to" meet that purpose or to perform that operation or function.

Figure 1:
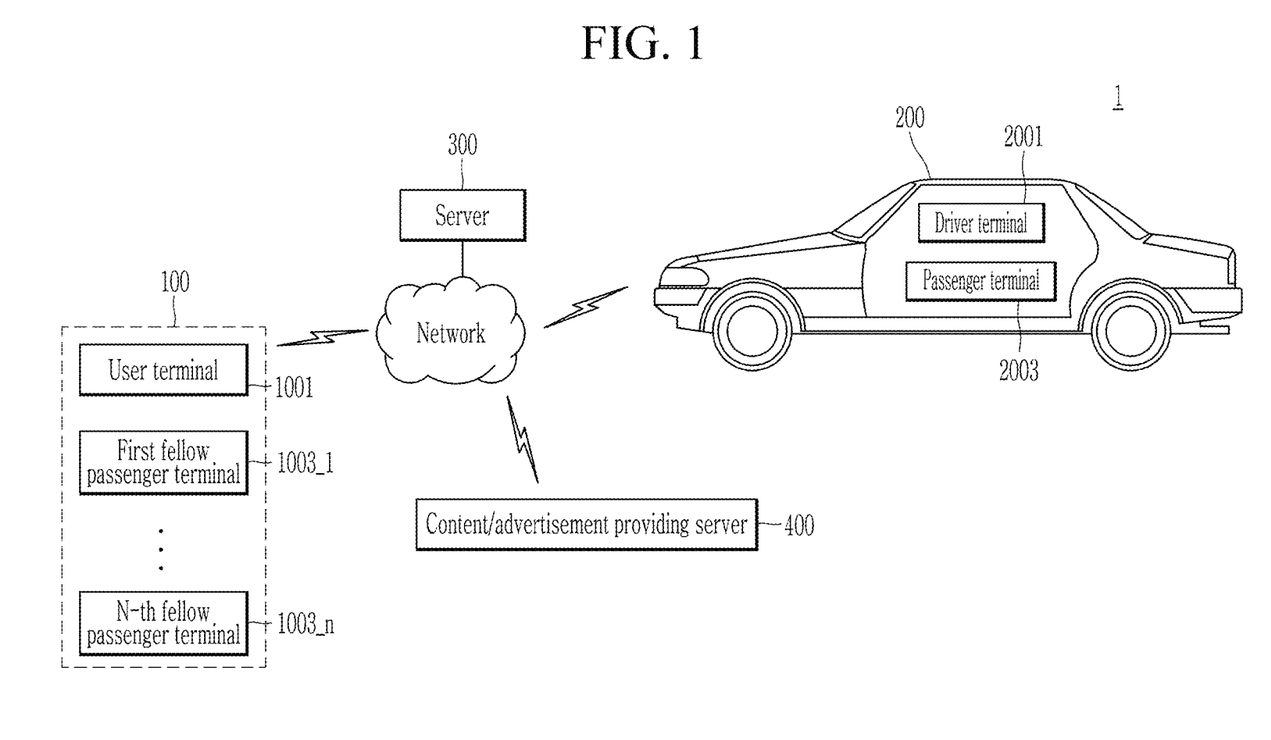
FIG. 1 is a schematic diagram of an advertisement providing system according to an embodiment of the present disclosure.
Figure 2:
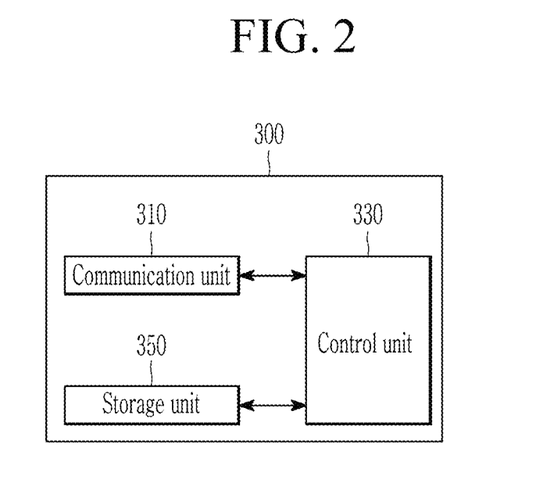
FIG. 2 is a block diagram showing a configuration of a server in an embodiment of the present disclosure.

FIG. 1 is a schematic diagram of an advertisement providing system according to an embodiment of the present disclosure, and FIG. 2 is a block diagram showing a configuration of a server in another embodiment.

Referring to FIG. 1, an advertisement providing system 1 includes a customer terminal 100, a vehicle terminal 200, a server 300, and a content/advertisement providing server 400.

The customer terminal 100, the vehicle terminal 200, the server 300, and the content/advertisement providing server 400 are connected to each other through a network, and may transmit and receive information necessary to provide a customized content and advertisement to the passenger in the vehicle.

The network includes a local area network (LAN), a wide area network (WAN), a value added network (VAN), a personal local wireless communication (Personal Area Network; PAN), a mobile radio communication network, a WiBro (Wireless Broadband Internet), a Mobile WiMAX, a High Speed Downlink Packet Access (HSDPA), a satellite communication network, etc., but is not limited thereto.

The customer terminal 100 is a terminal possessed by the passenger in the vehicle. The customer terminal 100 may include a user terminal 1001 and a plurality of passenger terminals 1003_1 to 1003_n.

The customer terminal 100 may be any terminal capable of communicating with an external device, such as a smart phone, a desktop PC, a tablet PC, a slate PC, a laptop computer (a notebook computer), a digital broadcasting terminal, a PDA (Personal Digital Assistant), a PMP (Portable Multimedia Player), a navigation device, a digital camera, and an MP3P (MPEG layer 3 Player).

The user terminal 1001 is a terminal possessed by a person who requests a call service for boarding a vehicle to the server. The fellow passenger terminals 1003_1 to 1003_n are terminals possessed by the fellow passenger boarding in the same vehicle as the person who requested the call service to the server. Hereinafter, a specific fellow passenger terminal among the fellow passenger terminals 1003_1 to 1003_n is referred to as a fellow passenger terminal 1003_i. In the present disclosure, the passenger may refer to both a user and a fellow passenger.

The user terminal 1001 may transmit the user's personal information to the server 300 through the network. The personal information may include the user's name, occupation, contact information, gender, age, and the like. If the user's personal information is stored in the server 300 in advance, the user terminal 1001 may not transmit the personal information to the server 300.

The user terminal 1001 may transmit the user's boarding information to the server 300 through the network. The boarding information may include information on a departure point where the user boards the vehicle, and a destination to which the user wants to go. The departure point may be a position in which the user is currently present.

In addition, the user terminal 1001 may transmit usage information to the server 300 through the network. The usage information may include a search word input by the user to the web server through the user terminal 1001, cookie information of the web server, information on frequently visited web servers, and the like. However, if the user of the user terminal 1001 does not want to transmit the usage information to the server 300, the user terminal 1001 may not transmit the usage information to the server 300.

Furthermore, the user terminal 1001 may transmit a fellow passenger additional request signal to the server 300 through the network. The fellow passenger additional request signal may include the contact information of the fellow passenger terminal.

As will be described later, in response to the fellow passenger additional request signal, the server 300 may transmit an information provision confirmation request signal to each of the fellow passenger terminals 1003_1 to 1003_n based on the contact information of the fellow passenger terminal.

The fellow passenger terminals 1003_1 to 1003_n may receive the information provision confirmation request signal from the server 300. The information provision confirmation request signal is a signal to the fellow passenger requesting to transmit the fellow passenger usage information to the server 300. Here, the fellow passenger usage information may include a search word input by the fellow passenger to the web server through fellow passenger terminals 1003_1 to 1003_n, the cookie information of the web server, and the like.

In response to the received information provision confirmation request signal, the fellow passenger may transmit the information provision conformation signal to the server 300 through the fellow passenger terminal 1003_i. The information provision conformation signal may include the fellow passenger usage information. If the fellow passenger does not want it, the information provision conformation signal may not be transmitted to the server 300 through the fellow passenger terminal 1003_i. If the information provision conformation signal is not transmitted to the server 300 through the fellow passenger terminal 1003_i, only the personal information of the fellow passenger may be provided to the server 300.

When boarding the vehicle dispatched through the call service, the passenger may receive the content and advertisement preferred by the user from the server 300 through the user terminal 1001 and/or the fellow passenger terminals 1003_1 to 1003_n.

The vehicle terminal 200 is a terminal within a vehicle, including a driver terminal 2001 and a passenger terminal 2003.

The driver terminal 2001 is a terminal used by the driver to be assigned a call service. The passenger terminal 2003 is a terminal that is installed at the rear seat of the vehicle and may be used by passengers.

The driver terminal 2001 may be any terminal capable of communicating with an external device such as a smart phone, a desktop PC, a tablet PC, a slate PC, a laptop computer (a notebook computer), a PDA (Personal Digital Assistants), a PMP (Portable Multimedia Player), a navigation device, and the like.

The driver terminal 2001 may transmit its current position to the server 300 at regular intervals. Typically, the position of the vehicle may be the same as that of the driver terminal 2001.

The driver terminal 2001 may receive a call dispatch signal from the server 300. The call dispatch signal is a signal that the server 300 transmits to the driver terminal 2001 to request a call service assignment.

In one form, when the server 300 receives a call request signal from the user terminal 1001, the server 300 may transmit the call dispatch signal to the driver terminal 2001 of the vehicle that is positioned within a predetermined distance from the departure point of the user or may arrive at the departure point within a predetermined time. The call dispatch signal may include boarding information of the user. The boarding information may include information about the departure point and the destination.

The driver terminal 2001 may receive the call dispatch signal and transmit a dispatch request signal to the server 300 in response to the call dispatch signal.

The dispatch request signal is a signal that the driver of the vehicle to provide the call service requests the allocation of the call service. The dispatch request signal may include information about the current position of the driver terminal 2001.

At this time, the server 300 may receive the dispatch request signal and allocate the call service to the vehicle corresponding to the driver terminal 2001 in response to the dispatch request signal. Thereafter, the server 300 may transmit the dispatch conformation signal to the user terminal 1001 and the driver terminal 2001.

The dispatch conformation signal transmitted to the user terminal may include vehicle information about the vehicle to which the call service is assigned. For example, the vehicle information may include a vehicle number, a current position of the vehicle, and a time it will take for the vehicle to go from the current position to the departure point, that is, an expected waiting time of the user. The dispatch conformation signal transmitted to the driver terminal may include information about the user, for example the user's contact information and the like.

The passenger terminal 2003 may include a rear monitor including a display means such as a display panel (a plasma display panel, PDP). Also, the passenger terminal 2003 may be a touchscreen including a touch sensor for detecting the passenger's touch. At this time, the passenger terminal 2003 may function as a user's input interface to the server 300, and may operate as an output interface of the server 300 to the user.

The passenger terminal 2003 may be equipped with an AVN (AUDIO, VIDEO, NAVIGATION) and an IVI (In-Vehicle Infotainment) system. In this case, the vehicle infotainment (IVI) is a word combining information and entertainment, and is a mobility service that transmits the information and provides the entertainment.

The passenger terminal 2003 may receive the playlist from the server 300 and display the content and advertisement corresponding to the content information and advertisement information in the playlist. The playlist is a list including the content information and advertisement information.

Also, the passenger terminal 2003 may receive the information such as a playlist selection through a touch sensor. In this case, by transmitting the received selection information to the server 300, the passenger terminal 2003 may receive the playlist corresponding to the selection information and the content and advertisement included in the playlist.

For example, the passenger may select any one of a plurality of playlists through the passenger terminal 2003, and the passenger terminal 2003 may transmit the received selection information to the server 300.

The server 300 may provide a service for allocating the vehicle according to the call service request of the customer terminal 100. Also, the server 300 may create the playlist comprising the content and advertisements preferred by each passenger based on the passenger's interests. In one form, the server 300 may create the playlist comprising the content and advertisements that all passengers commonly prefer. Thereafter, the server 300 may transmit the created playlist and/or the content and advertisement included in the playlist to the customer terminal 100 and/or the vehicle terminal 200.

Referring to FIG. 2, the server 300 includes a communication unit 310, a controller 330, and a storage unit 350.

The communication unit 310 communicates with the customer terminal 100, the vehicle terminal 200, and the content/advertisement providing server 400 through the network. The communication unit 310 transmits the data received from the customer terminal 100, the vehicle terminal 200, and the content/advertisement providing server 400 to the controller 330, or the data received from the controller 330 through the network to the customer terminal 100, the vehicle terminal 200, and the content/advertisement providing server 400.

The controller 330 processes the data received through the communication unit 310 and the data stored in the storage unit 350 to create the information for providing the content and advertisement customized to the passenger of the vehicle. The controller 330 may be implemented as software performing functions necessary for a passenger customized content and advertisement providing service or a program including a combination of software, and the program may be stored in a storage medium of the server 300. The storage medium may be implemented by a memory of various types such as a high-speed random-access memory, a magnetic disk storage device, a flash memory device, and a non-volatile memory such as other non-volatile solid-state memory devices.

The storage unit 350 may store predetermined information in advance to provide the content and advertisement customized to the passenger, and may store necessary information among the information obtained through the communication unit 310 or created by the controller 330.

The specific operation of the server 300 is described later with reference to FIG. 3 to FIG. 5 below.

The content/advertisement providing server 400 is a server that receives the user information from the server 300, determines the content/advertisement information corresponding to the received user information, and transmits the determined content/advertisement information, and the content/advertisement to the server 300.

Here, "the content" may be any type of data that may be provided through the network. For example, the content may be a type of a text, an audio, a video, a web page, etc., but is not limited thereto.

The user information may include personal information of the passenger, boarding information, usage information, and the like.

The content/advertisement providing server 400 may determine the content and advertisement expected to be preferred by the user based on the received user information, and may provide the determined content/advertisement information to the server 300. The content/advertisement information may include information on a title, a playback time, a type, etc. of the content and/or advertisement.

In another form, the content/advertisement providing server 400 may determine the content/advertisement information for a content/advertisement preferred by a group having the same job as the user, a content/advertisement preferred by a group having the same gender as the user, a content/advertisement preferred by a group having a similar age to the user, etc.

For example, the content/advertisement providing server 400 may store the information on classification criteria such as that clothing companies and fashion industry workers are generally interested in recent fashion trends, men in their late 20s are interested in vehicles, etc. For example, it is assumed that the content/advertisement providing server 400 receives the user information from the server 300 that the user is a 28-year-old male who works at a clothing company. Then, the content/advertisement providing server 400 may transmit, to the server 300, the content information about recent articles of fashion brands, recent actions of famous designers, and/or news about new vehicle launches, a comparison of vehicle brands, etc. Alternatively, the content/advertisement providing server 400 may transmit the advertisement information for a fashion brand on sale, the advertisement information for a vehicle rental company, etc. to the server 300.

Also, the content/advertisement providing server 400 may provide the server 300 with the content and advertisement information about a place expected to be preferred by the user near the destination.

For example, the content/advertisement providing server 400 may transmit, to the server 300, content information on a place preferred by the user near the destination of the user, and advertisement information on a restaurant near the destination.

Furthermore, the content/advertisement providing server 400 may select the content/advertisement related to the field of interest of the user and the content/advertisement for the web server similar to a frequently visited web server from among the various content/advertisement based on the cookie information.

For example, if the user has recently searched for "monitor" in the shopping server, the content/advertisement providing server 400 may derive that the user's interest is "monitor" through the cookie information. Thereafter, the content/advertisement providing server 400 may provide content related to "monitor", such as a point to be considered when purchasing the monitor, for example, to the server 300. Alternatively, the content/advertisement providing server 400 may provide advertisement information about a company selling "monitor" to the server 300.

The content/advertisement providing server 400 may provide the content/advertisement in an arbitrary method such as a download method or a streaming method, and the providing method is not limited.

Figure 3:
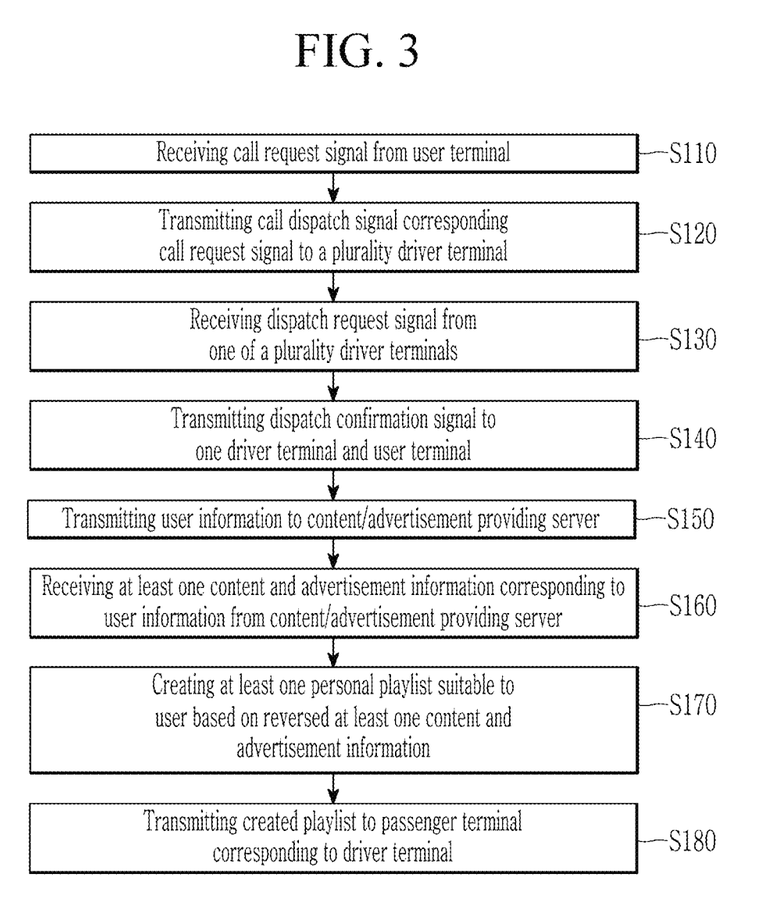
FIG. 3 is a flowchart showing a method for a server to provide content and advertisement when a user boards a vehicle without a passenger in another embodiment of the present disclosure.
Figure 4:
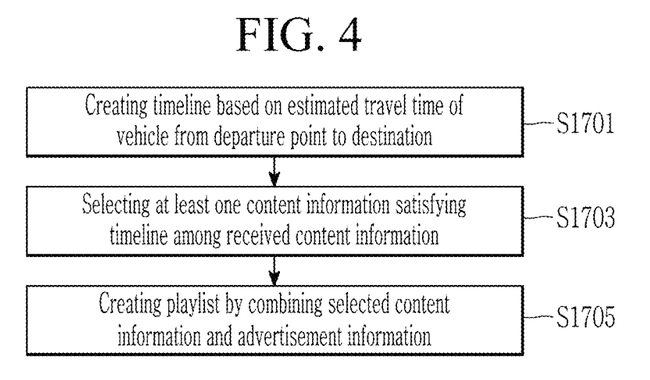
FIG. 4 is a flowchart specifically showing a step of creating a playlist in another embodiment.

FIG. 3 is a flowchart showing a method for a server to provide content and advertisement when a user boards a vehicle without a passenger, and FIG. 4 is a flowchart specifically showing a step of creating a playlist.

The server 300 receives a call request signal from the user terminal 1001 (S110).

At this time, the call request signal may include personal information and boarding information for the user using the user terminal 1001. The personal information may include a user's name, occupation, contact information, and the like. The boarding information may include the departure point and the destination.

However, when the user's personal information is stored in the server 300 in advance, the server 300 may not receive the personal information from the user terminal 1001.

The call request signal may further include the usage information of the user. The usage information may include cookie information including the search word input by the user to the web server through the user terminal 1001, the information on the frequently visited web servers, and the like.

The server 300 transmits the call dispatch signal corresponding to the call request signal to a plurality of driver terminals 2001 (S120).

As the call request signal is received from the user terminal 1001, the server 300 may transmit the call dispatch signal to the driver terminal 2001. Based on the departure point received from the user terminal 1001 and the position information of the driver terminals 2001, the server 300 may select vehicles positioned within a predetermined distance from the departure point or capable of arriving at the departure point within a certain time. Then, the server 300 may transmit the call dispatch signal only to the driver terminals 2001 of the selected vehicle.

The call dispatch signal may include the boarding information of the user.

The server 300 receives the dispatch request signal from one of a plurality of driver terminals (S130).

When the driver wants to allocate the call service received from the server 300, the driver may transmit the dispatch request signal to the server 300 through the driver terminal 2001.

The dispatch request signal may include the current position of the driver terminal 2001.

The server 300 transmits the dispatch conformation signal to the driver terminal and user terminal (S140).

The dispatch conformation signal may include the vehicle information about the vehicle operated by the driver of the driver terminal 2001 to which the call service is assigned. The vehicle information may include a vehicle number, a current position of the vehicle, and the like.

In addition, the dispatch conformation signal may further include a time it will take for the vehicle to get to the departure point.

For example, the server 300 may transmit, to the driver terminal 2001, the dispatch conformation signal including the path from the current position of the vehicle to the departure point and the estimated travel time. In addition, the server 300 may transmit, to the user terminal 1001, the dispatch conformation signal including the vehicle information of the vehicle to which the requested call service is assigned, the path where the vehicle comes to the user's position, the expected waiting time, and the expected travel time from the departure point to the destination.

The server 300 transmits the user information to the content/advertisement providing server 400 (S150).

In this case, the user information may include the personal information and the boarding information of the user who requested the call service through the user terminal 1001. The user information may further include the usage information of the user.

The server 300 receives at least one of content and advertisement information corresponding to the user information from the content/advertisement providing server 400 (S160).

The content/advertisement information may include the information on a title, a playback time, a type, etc. of the content and/or advertisement.

At least one of content and advertisement information received by the server 300 may relate to the content/advertisement preferred by the user.

The server 300 creates at least one user customized personal playlist based on at least one piece of received content and advertisement information (S170). The creating (S170) of the playlist is described in detail with reference to FIG. 4.

In the creating (S170) of the playlist, the server 300 creates a timeline based on the expected movement time of the vehicle from the departure point to the destination (S1701).

In one form, the server 300 may derive the shortest path from the departure point to the destination. Thereafter, the server 300 may calculate the estimated travel time for the vehicle to which the call service is assigned to go from the departure point to the destination through the shortest path in consideration of the current traffic situation. The server 300 may create the timeline based on the calculated estimated travel time.

The timeline refers to the length of the playlist. The playlist is a list including the content information and advertisement information. The sum of the playing time of the content and the playing time of the advertisement included in the playlist may be equal to the estimated travel time. The passenger may watch the content/advertisement for the length of the timeline.

The timeline may have the same length of time as the estimated travel time. However, since traffic conditions may change in real time, the timeline may be determined as a time within a predetermined range based on the estimated travel time.

For example, it is assumed that a predetermined range based on the estimated travel time is set to ±10% based on the estimated travel time in the server 300. If the estimated travel time calculated by the server 300 is 20 minutes, the server 300 may create the timeline with a short 18-minute length and the timeline with a long 22-minute length.

Furthermore, the user may set the time to watch the content and/or advertisement through the user terminal 1001. The user terminal 1001 may transmit a viewing time to the server 300, and the server 300 may determine the timeline based on the viewing time. The user may check the estimated travel time of the vehicle included in the dispatch conformation signal through the user terminal 1001. Thereafter, the user may input a desired timeline to the server 300 through the user terminal 1001. However, even in this case, the user may input the timeline having the same or similar time as the estimated travel time of the vehicle in which he/she boarded.

Hereinafter, for convenience of explanation, the timeline is described to be the same as the estimated travel time of the vehicle.

Thereafter, the server 300 selects at least one of content information that satisfies the timeline among the received content information (S1703).

For example, the server 300 may select the content information while excluding the content information having the playback time excessively exceeding the timeline. For example, when assuming that the estimated travel time from the departure point of the vehicle to the destination is 10 minutes, the server 300 may select the content while excluding the content having the playback time of 20 minutes or more among the received content information.

In this case, the server 300 may select the content information in consideration of the ratio that the content playback time corresponding to the content information and the advertisement playback time corresponding to the advertisement information is occupied in the timeline created in the step (S1701). The server 300 may select the content information so that the content may be provided during at least a certain ratio of the timeline.

For example, the server 300 may select the content information so that the content is provided for 80% or more of a predetermined timeline.

Next, the server 300 may select the content information in consideration of the content type. Specifically, the server 300 may consider the user's preference for the type of the content.

For example, the server 300 may determine a ratio occupied by a specific content type in the timeline based on usage information, and may select the content information of the corresponding type according to the determined ratio.

For example, it is assumed that the server 300 receives the usage information including a record of multiple accesses to a web page providing a music listening service from the user terminal 1001. The server 300 may determine that the user prefers the audio content. Accordingly, the server 300 may select a plurality of pieces of content information having an audio format so that the ratio occupied by the audio content in the playlist is the highest.

Furthermore, the server 300 may determine the user's preference in consideration of a plurality of items, and may select the preferred content of the user.

For example, when the server 300 determines the music content preference, the genre of the audio content, the singer, the mood of the song, and the like may be considered. When determining the image content preference, the genres of image content, the characters, etc. may be considered, and when determining the news content preference, topics such as politics/economy/entertainment may be considered.

Then, the server 300 creates a playlist by combining the selected content information and advertisement information (S1705).

Combining the selected content information and advertisement information in the step (S1703) means determining the order of the content information and/or advertisement information included in the playlist to determine the order in which the content and advertisement are replayed.

The server 300 may store various conditions that may be considered for combining the selected content information and advertisement information.

In addition, the server 300 may store a priority for the order in which the selected content information is disposed. Specifically, when there is no user's preferred content, the content that is popular with a plurality of customers may be positioned at the beginning of the playlist.

For example, in the case of the audio content, the server 300 may create the playlist while prioritizing the order of the user's preferred audio content, the popular audio content, and new audio content order. In addition, in the case of the video content, the server 300 may create the playlist while prioritizing the order of the video content of the user's preferred subscribed channel, the video content of the preferred unsubscribed channel, and the popular video content.

The server 300 may dispose the content information and advertisement information so that the content and advertisement are alternately replayed in the playlist. Specifically, the server 300 may dispose the content information and the advertisement information so that one of a plurality of pieces of advertisement information is positioned between two pieces of content information of a plurality of pieces of content information.

For example, when there is no advertisement information preferred by the user, the server 300 may dispose the advertisements in order of the preference. The preference of the advertisement may be determined based on the frequency with which the advertisement is selected from normal customers.

In addition, the server 300 may dispose the content information and the advertisement information so that the advertisement is replayed while the content is being replayed when the replay time of the content in the playlist is equal to or longer than a predetermined time.

For example, if the replay time of the content exceeds 5 minutes, a condition that at least one advertisement should be disposed in the middle of the content replay may be stored in the server 300. At this time, it is assumed that the replay time of the content information selected by the server 300 is 7 minutes. Then, the server 300 must dispose the advertisement information in the disposed content information.

The server 300 may create a plurality of playlists that satisfy the timeline.

Again referring to FIG. 3, the server 300 transmits the created playlist to the passenger terminal corresponding to the driver terminal (S180).

The server 300 may transmit all the created playlists to the passenger terminal.

In the passenger terminal 2003, the content/advertisement information for the received playlist may be output.

If there are multiple playlists received by the passenger terminal 2003 from the server 300, the passenger may select any one of the multiple playlists through the passenger terminal 2003. The passenger's selection is input to the server 300 through the passenger terminal 2003, and the server 300 may receive the content and advertisement corresponding to the selected playlist from the content/advertisement providing server 400 and transmit it to the passenger terminal 2003.

Also, the server 300 may transmit a plurality of playlists to the user terminal 1001.

Figure 5:
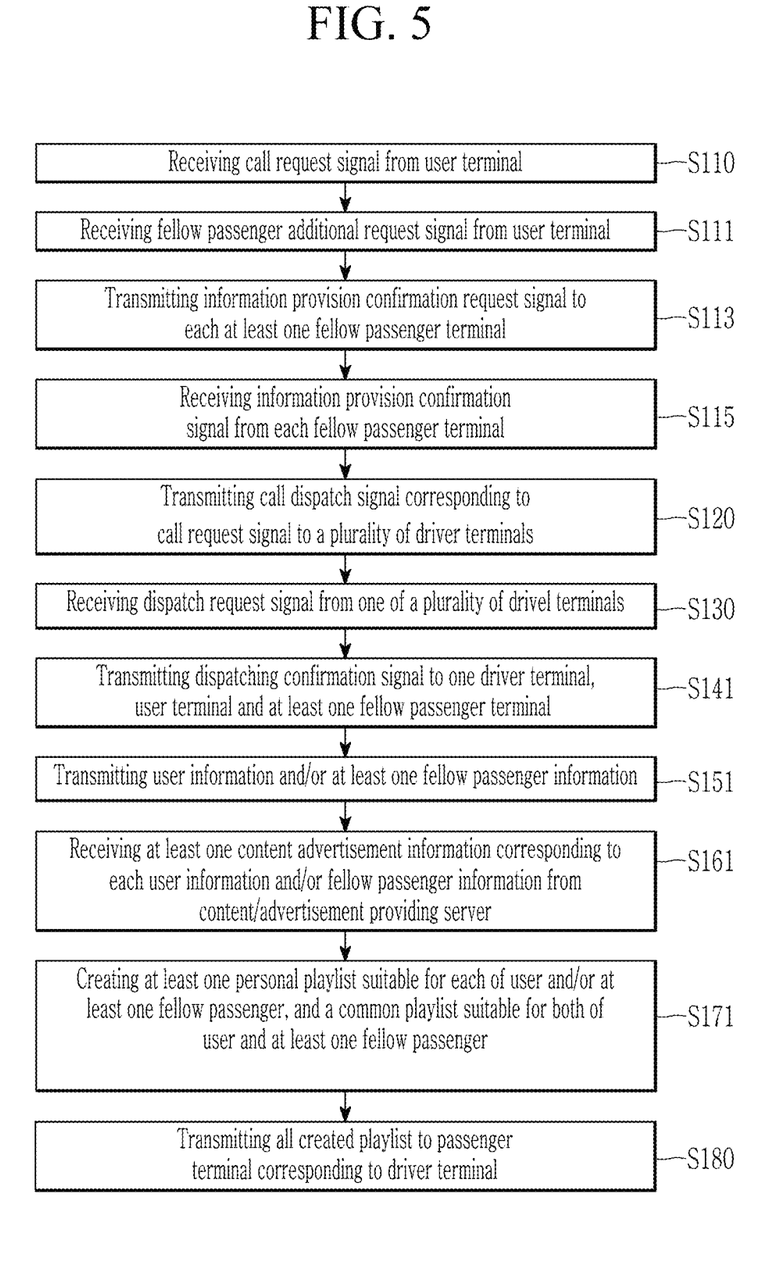
FIG. 5 is a flowchart showing a method for a server to provide content and advertisement when a user boards a vehicle together with a passenger in an embodiment of the present disclosure.

FIG. 5 is a flowchart showing a method for the server 300 to provide the passenger-customized content and advertisement when a user boards a vehicle together with a fellow passenger.

The server 300 receives a call request signal from the user terminal 1001 (S110).

The server 300 receives a fellow passenger additional request signal from the user terminal 1001 (S111).

The fellow passenger additional request signal may be personal information of the fellow passenger about the fellow passenger. The step (S111) may be performed simultaneously with the step (S110).

The server 300 transmits an information provision confirmation request signal to each at least one fellow passenger terminal (S113).

The server 300 may transmit the information provision confirmation request signal in response to receiving the fellow passenger additional request signal. Specifically, the server 300 may transmit the information provision confirmation request signal to each of the fellow passenger terminals 1003_1 to 1003_n corresponding to the fellow passenger contact information included in the fellow passenger personal information received from the user terminal 1001. The information provision confirmation request signal is a signal to request the fellow passenger through the fellow passenger terminal 1003_i to provide the fellow passenger usage information to the server 300.

The server 300 receives the information provision conformation signal from each fellow passenger terminal (S115).

The fellow passenger may transmit the information provision conformation signal to the server 300 through itself fellow passenger terminal 1003_i. The information provision conformation signal may include the fellow passenger usage information. Of course, if the fellow passenger does not want it, the information provision conformation signal may not be transmitted to the server 300 through the fellow passenger terminal 1003_i.

The server 300 transmits a call dispatch signal corresponding to the call request signal to a plurality of driver terminals (S120).

The server 300 receives the dispatch request signal from one of a plurality of driver terminals (S130).

The server 300 transmits the dispatch conformation signal to one driver terminal, the user terminal, and at least one fellow passenger terminal (S141).

The dispatch conformation signal may include the vehicle information about the vehicle operated by the driver of the driver terminal 2001 to which the call service is assigned. The vehicle information may include a vehicle number, a current position of the vehicle, and the like.

In addition, the dispatch conformation signal may further include a time it will take for the vehicle to get to the departure point.

The server 300 transmits the user information and/or at least one piece of fellow passenger information to the content/advertisement providing server 400 (S151).

In this case, the user information may include the personal information and the boarding information of the user who requested the call service through the user terminal 1001. The user information may further include the usage information of the user.

Fellow passenger information may include the personal information of the fellow passenger additionally requested by the user through the user terminal (1001). In the step (S115), when the server 300 receives the information provision conformation signal through the fellow passenger terminal 1003_i, the fellow passenger information may further include the usage information of the fellow passenger.

The server 300 receives at least one of content and advertisement information corresponding to each piece of the user information and/or at least one piece of fellow passenger information from the content/advertisement provision server 400 (S161).

The content/advertisement information may include information on a title, a replay time, a type, and the like of the content and/or advertisement.

At least one piece of content and advertisement information received by the server 300 may be related to the content and/or advertisement preferred by the user, and the content and/or advertisement preferred by the fellow passenger.

The server 300, based on at least one piece of received content and advertisement information, creates at least one personal playlist suitable for each of the user and/or at least one fellow passenger, and a common playlist suitable for both of the user and at least one fellow passenger (S171).

The method of creating the personal playlist suitable for the user and the personal playlist suitable for the fellow passenger is the same as described above with reference to FIG. 4. Here, the creation of the common playlist suitable for both the user and the fellow passenger is described in detail.

The server 300 creates the timeline based on the estimated travel time of the vehicle from the departure point to the destination (S1701).

Thereafter, the server 300 selects at least one piece of content information that satisfies the timeline among the received content information (S1703).

The server 300 may select the content information based on the content type preferred by each of the user and the fellow passenger.

Furthermore, the server 300 may determine the user's preference based on a plurality of items, and may select the user's preferred content information.

At this time, when there is a common element in consideration of the user's personal information and usage information and the personal information and usage information of each fellow passenger, the server 300 may determine a common preference based on this.

For example, it is assumed that three passengers board the vehicle. It may be determined that the user is a 29-year-old male who prefers the audio content, the first fellow passenger is a 25-year-old female who prefers the image content, and the second fellow passenger is a 27-year-old female who prefers the text content. At this time, the server 300 determines that all passengers are in their late 20s as a common factor, and may select the content information preferred by the late 20s.

If there is no common element for all passengers, the server 300 may select the content information preferred by ordinary customers.

Then, the server 300 creates the playlist by combining the selected content information and advertisement information (S1705).

At this time, the server 300 may create the personal playlist for each passenger and the common playlist for all passengers.

The server 300 may store various conditions that may be considered for combining the selected content information and advertisement information.

In addition, the server 300 may store a priority for the order in which the selected content information is disposed. Specifically, if there is no common preferred content for the user and the fellow passenger, a plurality of contents popular with the customers may be positioned in the first half of the playlist.

The server 300 may dispose any advertisement information between a plurality of pieces of content information.

For example, when there is no advertisement information preferred by the user and fellow passenger, the server 300 may dispose a plurality of advertisements based on the customer's interest.

The server 300 transmits all the created playlists to the passenger terminal corresponding to the driver terminal (S180).

The server 300 may transmit all the created playlists to the passenger terminal.

In the passenger terminal 2003, the content/advertisement information for the received playlist may be output.

The passenger terminal 2003 may receive the personal playlist for the user, the personal playlist for each fellow passenger, and the common playlist for all passengers from the server 300. The passenger may select any one of a number of playlists through the passenger terminal 2003.

The passenger's selection is input to the server 300 through the passenger terminal 2003, and the server 300 may receive the content and advertisement corresponding to the selected playlist from the content/advertisement providing server 400 and transmit it to the passenger terminal 2003.

Of course, the server 300 may transmit the personal playlist for the user to the user terminal 1001. Also, the server 300 may transmit the personal playlist for the fellow passenger to the fellow passenger terminal 1003_*i*. Furthermore, the server 300 may transmit all of the personal playlist for the user, the personal playlist for each fellow passenger, and the common playlist for all passengers to the user terminal 1001 and the fellow passenger terminal 1003_*i*. The user and fellow passenger may select the desired playlist among a plurality of playlists received from the server 300 through their respective terminals.

The advertisement providing method according to the present disclosure has a merit of being capable of providing the content and advertisement that are suitable according to the personal preference of the passenger.

The advertisement providing method according to the present disclosure has a merit of being capable of providing the content and advertisement based on the common preference of all of a plurality of passengers.

In addition, the advertisement providing method according to the present disclosure has a merit of being capable of naturally consuming the advertisements by creating a profile for each passenger and providing the playlist including the optimized content and advertisements throughout the passenger's travel journey.

The embodiments described above may be implemented in a form of a computer program that may be executed through various configurations elements on a computer, and such a computer program may be recorded in a computer-readable medium. In this case, the medium includes a magnetic medium that may include a hardware device specially configured to store and execute program instructions, such as a magnetic medium such as a hard disk, a floppy disk, and a magnetic tape, an optical recording media such as a CD-ROM and a DVD, and a magneto-optical medium such as a floptical disk, a ROM, a RAM, the flash memory 230.

The steps may be performed in an appropriate order unless there is an explicit description of the order or a description to the contrary with respect to the steps constituting the method according to the embodiments. The present disclosure is not necessarily limited to the order in which the steps are described. The use of all examples or terms (e.g., etc.) in the present disclosure is merely intended to describe the present disclosure in detail, and the scope of the present disclosure is not limited thereto. In addition, those having ordinary skill in the art should recognize that various modifications, combinations, and changes may be made within the scope of the present disclosure.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the present disclosure.

What is claimed is:

1. An advertisement providing method for providing a content and advertisement to a passenger of a vehicle while the vehicle is traveling, the advertisement providing method comprising:
   receiving, by a server, passenger information about a passenger from a user terminal of a passenger in a vehicle;
   wherein the receiving of the passenger information includes:
   receiving personal information including at least one of a name, a gender, an age, an occupation, or contact information of the passenger;
   receiving usage information including at least one of information about a search word input by the passenger to a web server through the user terminal, cookie information of the web server, or a frequently visited web server;

determining, by the server, a passenger preference based on the passenger information, and selecting a plurality of pieces of content information and a plurality of pieces of advertisement information based on the determined passenger preference;

monitoring, by the server, real-time traffic conditions while the vehicle is traveling;

calculating, by the server, an estimated travel time for the vehicle to arrive, from a departure point of the vehicle, at a destination based on the passenger information;

determining, by the server, a time duration of a playlist by extending or shortening the estimated travel time by a predetermined amount of time based on the monitored real-time traffic conditions;

wherein the selecting of a plurality of pieces of content information and a plurality of pieces of advertisement information includes:
  determining the passenger preference for a content type based on the usage information; and
  selecting pieces of content information and pieces of advertisement information based on the passenger preference for the content type;

transmitting, by the server, the at least one created playlist to a passenger terminal positioned in the vehicle; and controlling, by the server, the passenger terminal positioned in the vehicle to play the at least one created playlist while the vehicle is traveling, wherein selecting the plurality of pieces of content information and the plurality of pieces of advertisement information comprises selecting the plurality of pieces of content information and the plurality of pieces of advertisement information further based on the destination and considering a ratio of a replay time period corresponding to the selected plurality of pieces of content information to the determined time duration of the play list, and wherein the creating of at least one playlist includes creating the at least one playlist to enable a piece of advertisement among the selected pieces of advertisement information to be played while a first content is being played, enable the first content to be stopped while the advertisement is being played, and enable the first content to resume playing when the advertisement is finished from a point where the first content is stopped, and wherein a replay time period of the first content corresponding to first content information, which is one of the selected plurality of pieces of content information in the at least one playlist, is equal to or longer than a predetermined time.

2. The advertisement providing method of claim 1, wherein the creating of at least one playlist includes
  arranging a piece of advertisement information of the plurality of pieces of advertisement information between two pieces of content information of the plurality of pieces of selected content information.

3. An advertisement providing method for providing a content and advertisement to a passenger of a vehicle while the vehicle is traveling, the advertisement providing method comprising:
  receiving, by a server, passenger information about a passenger from a user terminal of a passenger in a vehicle; receiving, by the server, fellow passenger information about a fellow passenger in the vehicle from the user terminal;

wherein the receiving of the passenger information includes:
    receiving personal information including at least one of a name, a gender, an age, an occupation, or contact information of the passenger;
    receiving usage information including at least one of information about a search word input by the passenger to a web server through the user terminal, cookie information of the web server, or a frequently visited web server;

determining, by the server, a passenger preference based on the passenger information, and determining a fellow passenger preference based on the fellow passenger information, selecting a plurality of pieces of content information based on the determined passenger preference and fellow passenger preference to create a first content information group, and selecting a plurality of pieces of advertisement information to create a first advertisement information group;

monitoring, by the server, real-time traffic conditions while the vehicle is traveling;

calculating, by the server, an estimated travel time for the vehicle to arrive, from a departure point of the vehicle, at a destination based on the passenger information by the server;

determining a time duration of a common playlist by extending or shortening the estimated travel time by a predetermined amount of time based on the monitored real-time traffic conditions;

selecting, by the server based on the estimated travel time and the determined time duration of the common playlist, a plurality of pieces of content information from the first content information group selecting a plurality of pieces of advertisement information, and creating at least one common playlist by combining the selected plurality of pieces of content information and the selected plurality of pieces of advertisement information, wherein a sum of replay time periods of the selected plurality of pieces of content information and the selected plurality of pieces of advertisement information is equal to the determined time duration of the common playlist;

wherein the selecting of a plurality of pieces of content information and a plurality of pieces of advertisement information includes:
    determining the passenger preference for a content type based on the usage information; and
    selecting pieces of content information and pieces of advertisement information based on the passenger preference for the content type;

transmitting the at least one created common playlist to a passenger terminal positioned in the vehicle by the server; and controlling the passenger terminal positioned in the vehicle to play the at least one created common playlist while the vehicle is traveling, wherein selecting the plurality of pieces of content information comprises selecting the plurality of pieces of content information further based on the destination and selecting the plurality of pieces of advertisement information comprises selecting the plurality of pieces of advertisement information further based on the destination wherein the at least one common playlist is created considering a ratio of a replay time period corresponding to the selected plurality of pieces of content information to the determined time duration of the common playlist, wherein the at least one common playlist is created to enable a piece of advertisement among the selected pieces of advertisement information to be played while a first content is being played, enable the first content to be stopped while the advertisement is being played, and enable the first content to resume playing when the advertisement is finished from a point where the first content is stopped, and wherein a replay time period of the first content corresponding to first content information, which is one of the selected plurality of pieces of content information in the at least one common playlist, is equal to or longer than a predetermined time.

4. An advertisement providing server for providing a content and advertisement to a passenger of a vehicle while the vehicle is traveling, the advertisement providing server comprising:

a communication unit configured to receive passenger information about a passenger from a user terminal of the passenger in the vehicle and a controller, wherein the controller is configured to:
determine a passenger preference based on the passenger information and select a plurality of pieces of content information and a plurality of pieces of advertisement information based on the determined passenger preference,
wherein the receiving of the passenger information includes:
receiving personal information including at least one of a name, a gender, an age, an occupation, or contact information of the passenger;
receiving usage information including at least one of information about a search word input by the passenger to a web server through the user terminal, cookie information of the web server, or a frequently visited web server; wherein the receiving of the passenger information includes:
monitor real-time traffic conditions while the vehicle is traveling,
calculate an estimated travel time for the vehicle to arrive, from a departure point of the vehicle, at a destination based on the passenger information,
determine a time duration of a playlist by extending or shortening the estimated travel time by a predetermined amount of time based on the monitored real-time traffic conditions;
create, based on the estimated travel time and the determined time duration of the playlist, at least one playlist including at least one of selected pieces of content information and selected pieces of advertisement information, wherein a sum of replay time periods of the at least one of selected pieces of content information and selected pieces of advertisement information is at least equal to the determined time duration of the playlist;
wherein the selecting of a plurality of pieces of content information and a plurality of pieces of advertisement information includes:
determining the passenger preference for a content type based on the usage information; and
selecting pieces of content information and pieces of advertisement information based on the passenger preference for the content type;

transmit the at least one created playlist to the user terminal located in the vehicle by the communication unit; and
control the passenger terminal positioned in the vehicle to play the at least one created playlist while the vehicle is traveling,
wherein the plurality of pieces of content information comprises the plurality of pieces of content information for the destination and the plurality of pieces of advertisement information comprises the plurality of pieces of advertisement information for the destination,
wherein the at least one playlist is created considering a ratio of a replay time period corresponding to the selected plurality of pieces of content information to the determined time duration of the playlist,
wherein the at least one playlist is created to enable a piece of advertisement among the selected pieces of advertisement information to be played while a first content is being played, enable the first content to be stopped while the advertisement is being played, and enable the first content to resume playing when the advertisement is finished from a point where the first content is stopped, and
wherein a replay time period of the first content corresponding to first content information, which is one of the selected plurality of pieces of content information in the at least one playlist, is equal to or longer than a predetermined time.

5. The advertisement providing server of claim 4, wherein the playlist includes a piece of advertisement information of the plurality of pieces of advertisement information which is positioned between two pieces of content information of the plurality of pieces of selected content information.

6. An advertisement providing server for providing a content and advertisement to a passenger boarding a vehicle while the vehicle is traveling, the advertisement providing server comprising:

a communication unit configured to receive passenger information about a passenger from a user terminal of the passenger in the vehicle and a controller, wherein the controller is configured to:
receive fellow passenger information about a fellow passenger in the vehicle from the user terminal,
wherein the receiving of the passenger information includes:
receiving personal information including at least one of a name, a gender, an age, an occupation, or contact information of the passenger;
receiving usage information including at least one of information about a search word input by the passenger to a web server through the user terminal, cookie information of the web server, or a frequently visited web server; wherein the receiving of the passenger information includes:
determine a passenger preference based on the passenger information, select a plurality of pieces of content information to create a first content information group based on the determined passenger preference and a fellow passenger preference, select a plurality of pieces of advertisement information to create a first advertisement information group,
monitor real-time traffic conditions while the vehicle is traveling, calculate an estimated travel time for the vehicle to arrive, from a departure point of the vehicle, at a destination based on the passenger information, determine a time duration of a common playlist by extending or shortening the estimated travel time by a predetermined amount of time based on the monitored real-time traffic conditions, select a plurality of pieces of content information from the first content information group and a plurality of pieces of advertisement information from the first advertisement information group, create at least one common playlist by combining the selected plurality of pieces of content information and the selected plurality of pieces of advertisement information, wherein a sum of replay time periods of the selected plurality of pieces of content information and the selected plurality of pieces of advertisement information matches with the determined time duration of the common playlist, wherein the selecting of a plurality of pieces of content information and a plurality of pieces of advertisement information includes:

determining the passenger preference for a content type based on the usage information; and selecting pieces of content information and pieces of advertisement information based on the passenger preference for the content type;

transmit the at least one created common playlist to the user terminal positioned in the vehicle through the communication unit; and control the passenger terminal positioned in the vehicle to play the at least one created common playlist while the vehicle is traveling, wherein the plurality of pieces of content information comprises the plurality of pieces of content information for the destination and the plurality of pieces of advertisement information comprises the plurality of pieces of advertisement information for the destination, wherein the at least one common playlist is created considering a ratio of a replay time period corresponding to the selected plurality of pieces of content information to the determined time duration of the common playlist, wherein the at least one common playlist is created to enable a piece of advertisement among the selected pieces of advertisement information to be played while a first content is being played, enable the first content to be stopped while the advertisement is being played, and enable the first content to resume playing when the advertisement is finished from a point where the first content is stopped, and wherein a replay time period of the first content corresponding to first content information, which is one of the selected plurality of pieces of content information in the at least one common playlist, is equal to or longer than a predetermined time.

* * * * *